Aug. 11, 1953  R. DÉTREZ  2,648,419
AUTOMATIC LOADING DEVICE FOR BOTTLES
AND THE LIKE CONTAINERS
Filed Aug. 5, 1949  4 Sheets-Sheet 1
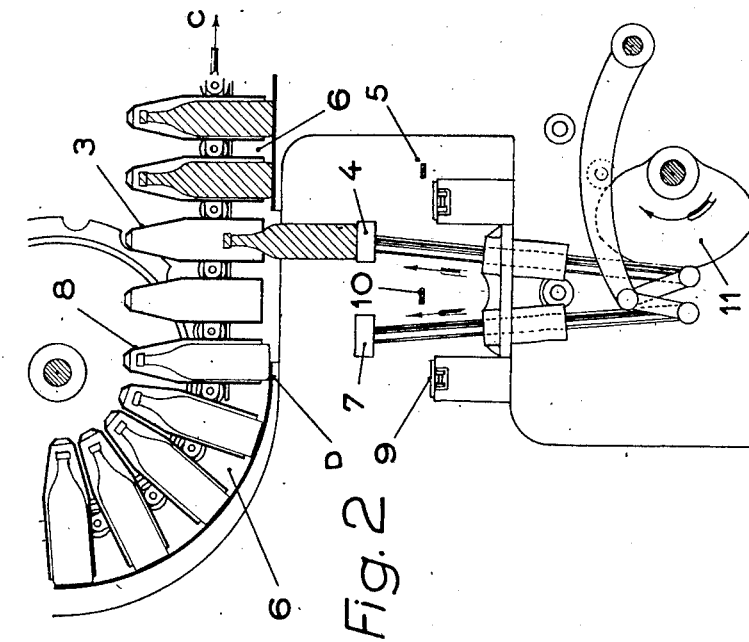
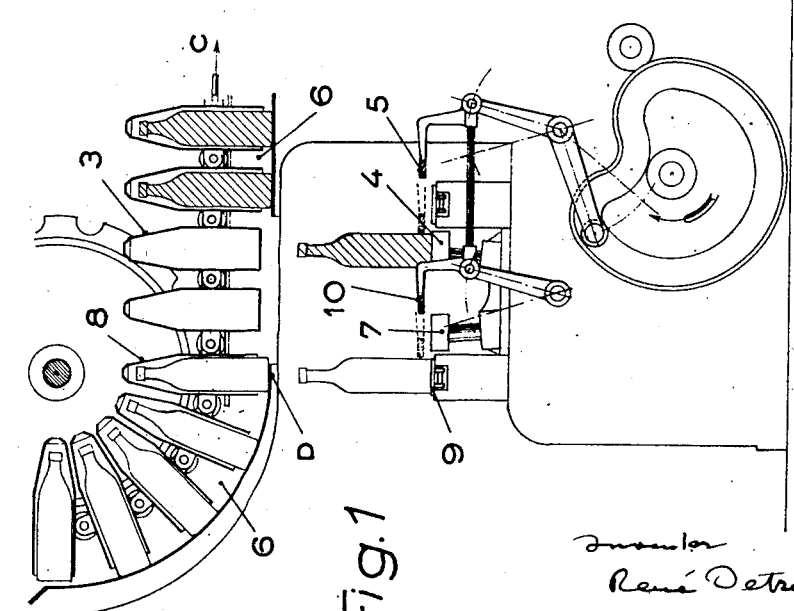
Inventor
René Detrez

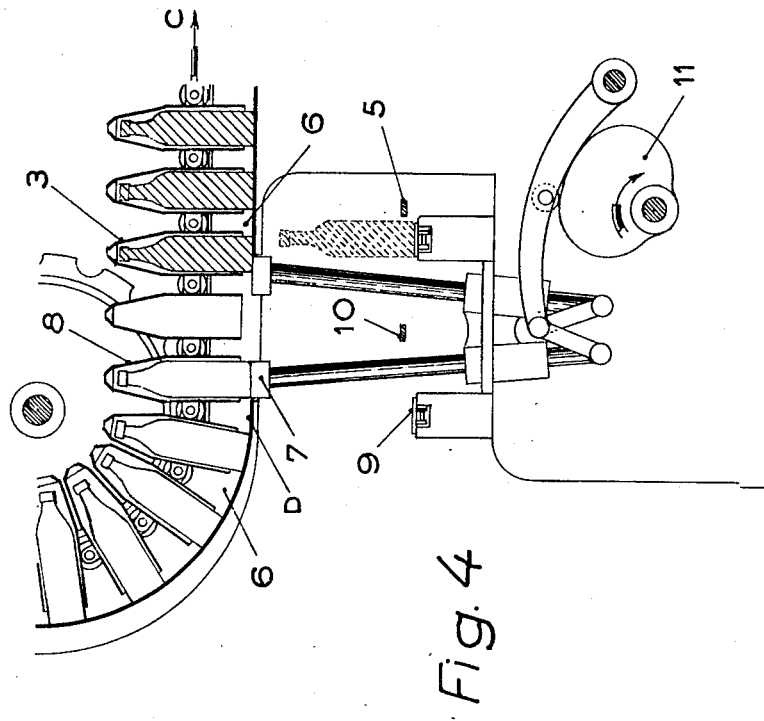
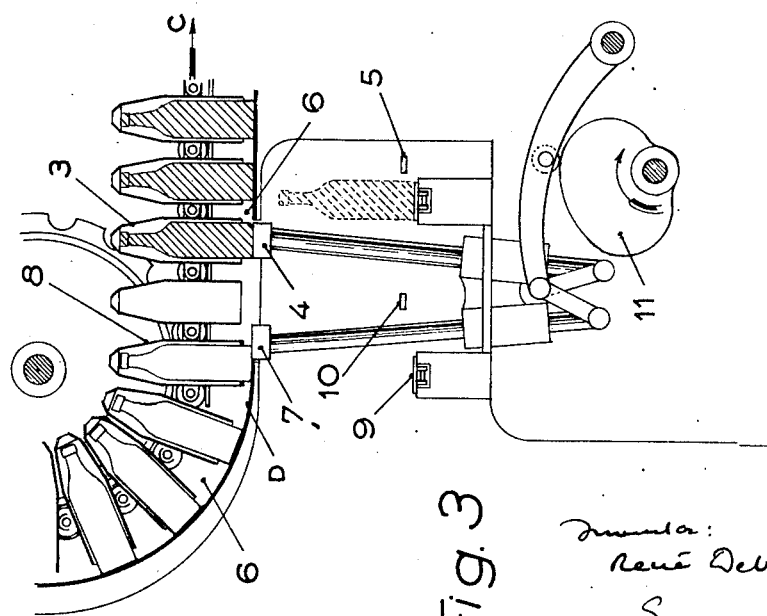

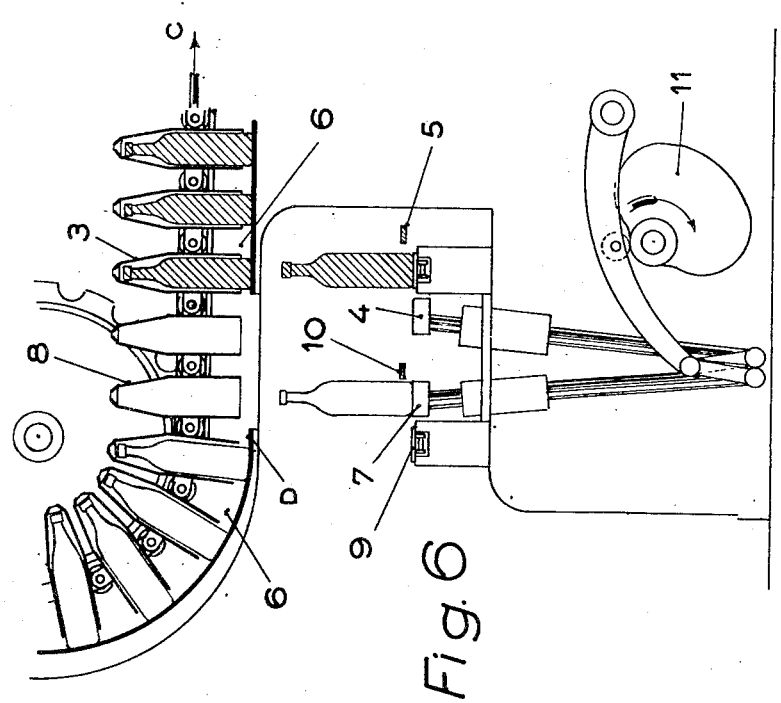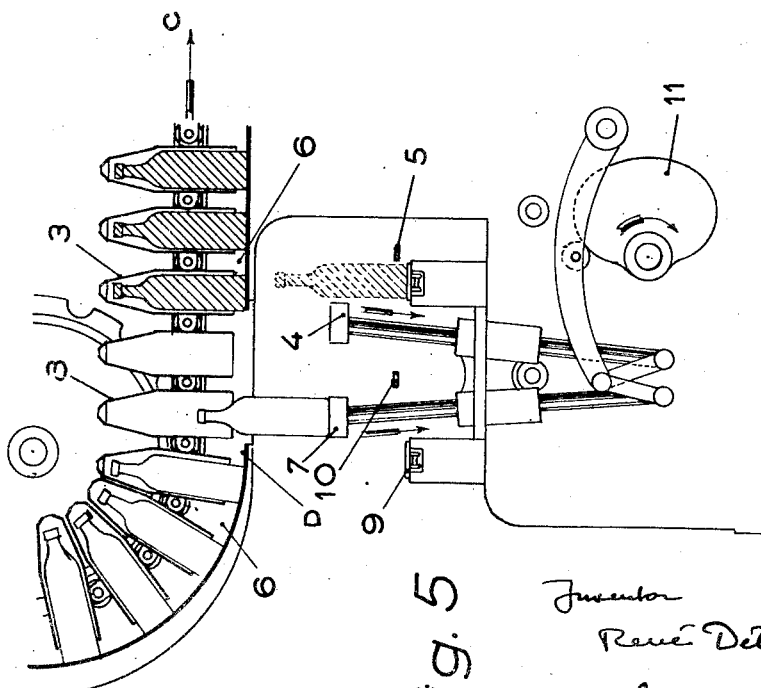

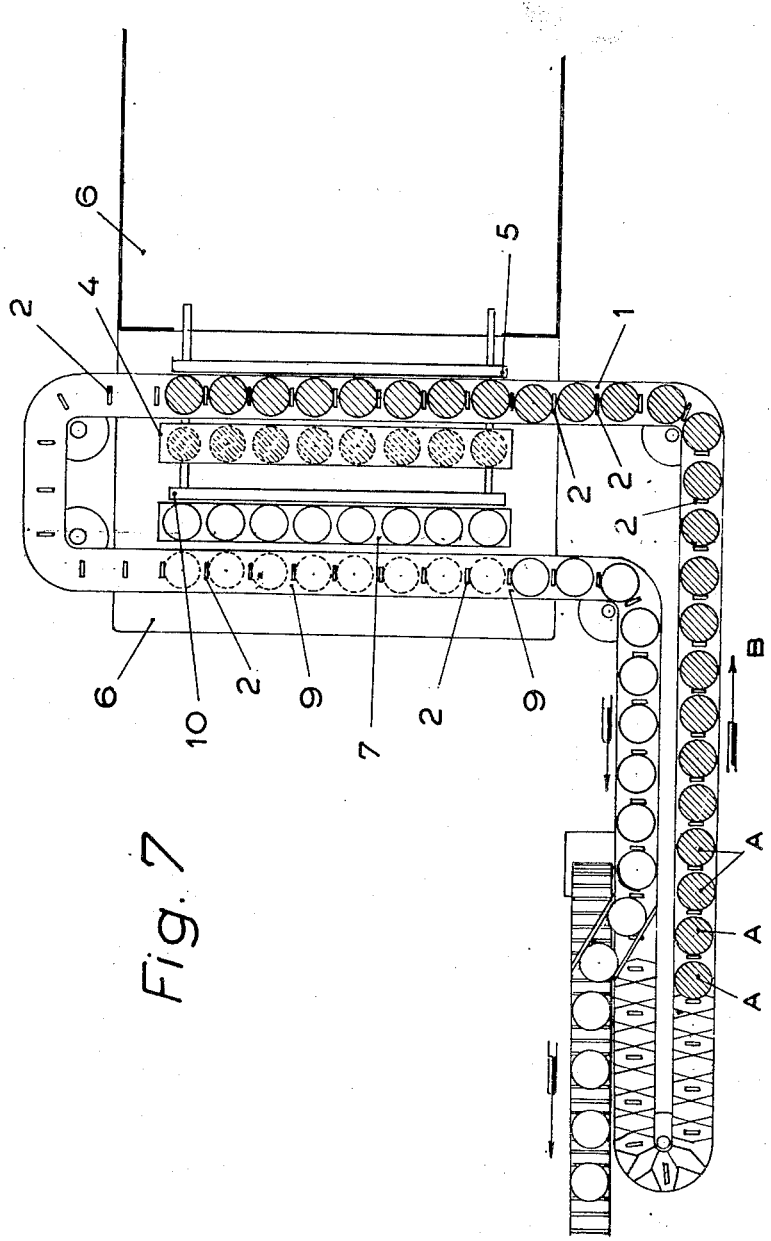

Patented Aug. 11, 1953

2,648,419

UNITED STATES PATENT OFFICE 2,648,419

AUTOMATIC LOADING DEVICE FOR BOTTLES AND THE LIKE CONTAINERS

René Détrez, Nogent-sur-Marne, France

Application August 5, 1949, Serial No. 108,731
In France August 6, 1948

6 Claims. (Cl. 198—24)

My invention relates to machines for washing, warming, drying and aseptising and treating in the like manner bottles, flasks, pots, cans and the like containers and any other machine or apparatus incorporating one or more boxes for the automatic and temporary introduction therein of such receivers and removal thereof of same.

My invention is applicable to the above machines or apparatuses either for loading purposes only i. e. for distributing and introducing automatically the containers to be treated into the series of holders of the machine or else it is applicable only for unloading, i. e. for extracting from these holders the containers with a view to removing them automatically or again the invention is applicable for both operations with the same machine or apparatus.

Certain extant apparatuses provide such operations by unloading the containers in a sloping position as they pass out of the holder openings of the bottle-carrying means which leads to rocking them back into their normal upright position before their automatic removal.

Other apparatuses do not rock the containers but require an intermittent movement for the progression of the train of holders forming a bottle rack or bottle racks, or else they require intricate or difficult movements that may be unfavorably affected during operation chiefly in the case of broken glass lying in the way.

The apparatus forming the object of the present specification is somewhat similar to those disclosed in my British Patent 581,404 but it is designed in a manner such as to remove the drawbacks or lack of complete operativeness of the existing apparatuses, as mentioned, while requiring only simple movements and cutting out all delicate parts.

Although my invention is applicable to machines executing various operations as disclosed and the containers treated in said machines are also of various types, as also disclosed, I shall now refer for sake of clarity and by way of exemplification to a simple bottle-washing machine. For this same purpose of simplification, I shall use hereinafter in the specification and claims the words "bottle" or "container" indifferently for designating the various above-mentioned containers.

My invention is therefore applicable to the operations of loading and unloading containers, said two operations being executed separately or in combination and the features of my improved machine may be disclosed as follows.

The apparatus intended solely for loading or unloading or again for loading and unloading bottles or the like containers, comprises at least one platform carrying the containers and submitted to a vertical reciprocation, a set of bottle racks assuming a translational movement, at least one horizontally progressing conveyor for the containers and at least one horizontal pusher member for the containers, said apparatus being provided with at least one of the following improvements:

The carrier platform serves exclusively for raising in their upright position a series of containers to be treated, which containers are introduced into the openings of the set of bottle racks assuming a continuous translational movement, the container-carrier rising obliquely in a manner such that the horizontal resultant of its oblique movement may correspond substantially to the direction and speed of continuous translation of the above-mentioned bottle racks;

A second vertically reciprocating container carrying platform independent of the first one serves only for the downward movement of a series of containers from the train of continuously advancing bottle racks, the containers being carried upright therein, said second carrier platform executing its downward movement also in an oblique direction in a manner such that the horizontal resultant of the oblique movement may correspond substantially to the direction and speed of the bottle racks arriving from the treating means;

The bottle raising and lowering platforms are controlled by means actuating separately the vertical reciprocation of the corresponding platform or else by a single common cam or the like member controlling both movements;

The bottle raising platform is associated with a horizontally moving container transferring the containers on to said platform through a horizontal shifting of the containers while the containers remain constantly upright;

The container carrying platform assuming a bottle-lowering movement is also associated with a horizontally moving conveyor removing the treated containers that also move in a horizontal plane and remain constantly upright;

The regular spacing between the containers is equal to that between the bottle holders wherein the containers are introduced automatically and it is obtained directly on the horizontally moving conveyor feeding the containers to the first platform through the provision of projections on the conveyor on which the containers are set at the start either manually or automatically and the progression of the conveyor is defined in a manner such that said containers may stand in register with the path of the openings in the bottle racks that are to receive them at the moment at which said containers are transferred from the conveyor on to the carrier platform for subsequent introduction into said bottle racks;

The continuous translational movement of the bottle racks associated with the vertically moving platforms may be a uniform speed or a periodically decelerated and accelerated speed movement, in which latter case synchronous acceleration is produced at the moment at which the platforms considered have both reached their highest positions;

The bottle raising platform or first platform is positioned at one end of the machine to which it is incorporated while the second platform, used for extracting the containers from the set of bottle racks is arranged at the other end of the machine to which it is also incorporated, means being provided for synchronizing the movements of the two platforms with the translational movement of the bottle racks;

The carrier platform arrangement adapted to raise the containers is associated with an arrangement of any known type for unloading said containers, the two arrangements considered being incorporated to the same machine, either at the same end thereof or at both ends thereof, while their movements are synchronized with the translational movement of the bottle racks;

An arrangement of any type for loading the containers to be treated is used for introducing said containers into the openings of the bottle racks and is associated with the second platform arrangement lowering the containers towards the bottle removing means, the two arrangements being incorporated to the same machine, either at the same end thereof or at opposite ends thereof, while means are provided for synchronizing the movements of the two arrangements with the translational movement of the bottle racks.

In order to make my invention clearer, and by way of a mere exemplification without any binding sense being attached thereto, I shall now describe with reference to accompanying drawings the application of the invention to a bottle-washing machine, although, as stated, the invention is applicable to any other machine incorporating a train of bottle holders or bottle racks inside which containers of any description are to be transiently introduced and out of which the containers are extracted when required.

In said drawings:

Fig. 1 is a diagrammatic lateral elevational view illustrating the two platforms carrying the bottles and assuming respectively an oblique rising and an oblique sinking movement, the platforms being supposed to lie in their lowermost position. The bottles on the right hand side, shown with hatchings, are dirty bottles while the bottles on the left hand side are clean bottles.

Fig. 2 is a similar diagrammatic view illustrating the two bottle carriers during their rising movements, the right hand platform carrying the dirty bottles to be treated, while the left hand platform is to take a number of washed bottles.

Fig. 3 is a diagrammatic view similar to Figs. 1 and 2 with the difference that the two carriers are at the uppermost points of their upward movement at the moment at which the dirty bottles on the right hand side have just been introduced into the corresponding bottle-holder openings while the washed bottles on the left are not yet removed to a sufficiently complete extent for them to rest on the downwardly moving platform on the left hand side.

Fig. 4 is again a similar view of the two platforms at the end of their stationary stages at the uppermost point of their upward strokes. By reason of the translational movement of the bottle racks, a series of washed bottles has then come to register with the platform assuming an operative downward movement and said bottles are ready to move out of the openings containing said bottles.

Fig. 5 is also a similar view of the two platforms during their downward movement, that on the right hand side being empty, while the platform on the left sinks with the washed bottles on it.

Fig. 6 is a last view similar to the preceding ones with the two platforms in their lowermost positions, for which a further series of dirty bottles has not been transferred on to the platform that is to raise them and the series of washed bottles is not yet transferred on to the bottle removing conveyor.

Lastly, Fig. 7 is a plan view showing the association of the two platforms with a horizontally moving conveyor on which the spacing of the bottles is obtained by means of projections secured to said conveyor at suitable points.

The operation of the arrangement is as follows as concerns the steps of the loading operation:

The dirty bottles illustrated by hatchings are laid by hand or automatically on the horizontally advancing conveyor at point A for instance, said conveyor moving in the direction of the arrow B (Fig. 7).

It will be noticed that said conveyor 1 is provided with projections 2 that have for their purpose to define the spacing between the bottles by an interval equal to the spacing between the openings in the successive bottle racks C that are to carry said bottles.

The translational speed of the conveyor 1 is synchronized with the progression of the train of bottle racks; as soon as a series of dirty bottles, the number of which is equal to that of the openings in one of the bottle racks 3, arrives in front of the platform 4 and in register with the path of the bottle rack openings lying above said series of dirty bottles, said bottles are urged forwardly by a bar 5 that transfers them from the conveyor 1 on to the platform 4 considered.

This stage of operation is illustrated in Fig. 1.

Only when the dirty bottles rest completely on the platform 4, the rising movement of the latter along an oblique line will begin. This stage of operation is shown in Fig. 2.

Fig. 2 shows, in fact, that the rising movement of the platform 4 is executed obliquely and consequently each rising bottle moves both in a vertical and in a horizontal plane, its vertical movement being executed in the same direction as the continuous translational movement of the set of bottle racks, i. e. in the direction of the arrow C.

It is sufficient to adjust once and for all the position of the bottle racks 3 with reference to the lowermost position of the platform 4 in horizontal projection and to give the platform 4 an oblique rising movement for the horizontal relative displacement of said platform to coincide substantially with the movement in the same direction of the bottle racks, whereby the bottles carried by the platform 4 remain constantly during their rising movement in register with the corresponding openings in the bottle rack, they enter thus readily into said openings during the continuous translational movement in said direction of the arrow C.

When the rising movement of the dirty bottles reaches its uppermost point as illustrated in Fig. 3, said bottles are entirely engaged inside the corresponding bottle rack which, as already disclosed, assumes a continuous horizontal translational movement. Consequently the dirty bottles are now carried along horizontally, the platform 4 remaining momentaneously in its uppermost position and when the bottoms of the bottles progressing with the rack have engaged the platform or box 6 that is stationary, the loading operation is at an end.

Said stage of operation is illustrated in Fig. 4 where it may be noticed that the series of dirty bottles introduced into the bottle rack 3 has already engaged the box-like structure 6.

Now if we consider the stages of the unloading operations, they are as follows: at a moment of the cycle of operation of the platform 4, say during the rising movement of the dirty bottles on the platform 4, the second bottle-carrying platform 7 carrying bottles has also risen while remaining empty and it enters a position at a level with and in alignment with the part D of the box shaped structure 6.

The bottle rack 8 by reason of its translational movement in the direction of the arrow C, arrives on to the platform 7. The washed bottles contained therein rest then entirely on the platform 7.

It is therefore possible for the bottles to leave the rack 8 and at this moment the platform 8 begins moving downwardly, said downward movement being illustrated in Fig. 5. It will also be noticed in said Fig. 5 that the downward movement of the platform 7 is performed on an oblique line and consequently each lowered bottle is moved both in a vertical and in a horizontal direction, the horizontal relative shifting being performed in the same direction as the continuous movement of the bottle rack associated with the unloading means, that is in the direction of the arrow C.

As already disclosed for the rising of the platform 4, it is necessary for the downwardly urged bottles to remain constantly in register with corresponding bottle holder openings during the downward movement and to leave said openings without any danger of being shifted with reference to the platform 7 and for this purpose it is sufficient that the location of the bottle racks 8 may be adjusted once and for all with reference to the position occupied in horizontal projection by said platform 7 at one end of its stroke while the downward movement of the latter platform may assume a suitable obliquity in order that the amount of horizontal shifting of said platform may coincide substantially with the simultaneous shifting in the same direction of the train of bottle racks.

When the platform 7 arrives at the lower end of its stroke, the series of washed bottles carried by it is transferred from said platform on to the conveyor 9 used for the removal of the bottles, said transfer being provided through the thrust bar 10. The independent platforms 4 and 7 may receive their reciprocating movement separately through different members or, as illustrated, through a single cam 11, the outline of which may in most cases control suitably the two vertically reciprocating movements.

It should be noted that during the stages of upward movement, stopping in the upper position and downward movement executed by the platforms 4 and 7, the conveyor 1 brings in front of the thrust bar 5 a further series of dirty bottles while on the other end the platform 4 that has been freed of the dirty bottles that have been raised returns downwardly in an empty state and simultaneously the platform 7 sinks together with its load of washed bottles.

As soon as the platforms arrive at the lowermost point of their stroke, the thrust bars 5 transfer immediately a further batch or series of dirty bottles on to the platform 4 at the same time as the thrust bar 10 transfers the washed bottles from the platform 7 on to the removal conveyor 9 as disclosed hereinabove.

The different stages of operation begin then over again as precedingly.

It should be remembered that the invention may be applied either to the loading operation alone or to the discharging operation alone or to both operations together as in the example illustrated.

It should also be remembered that in the case of two associated operations, the loading and unloading means may be incorporated to the machine considered at the same end thereof or else they may be provided at opposite ends of the machine.

Lastly a same machine may incorporate a loading (or unloading) system according to the invention with an unloading (or loading) machine of a known type.

Obviously many modifications and substitution of equivalent means may be provided without unduly widening thereby the scope of the invention as defined in accompanying claims.

What I claim is:

1. Article handling apparatus, for handling articles such as bottles and the like, comprising, in combination, a plurality of open-bottom article holders mounted on the apparatus for movement along a predetermined, straight, horizontal path; a stationary support having a top surface located directly beneath said path and having a horizontal free edge; moving means operatively connected to said article holders for continually moving the same, during operation of the apparatus, at a predetermined speed along said horizontal path toward said free edge of said top surface of said support and over the latter; a platform located beneath one of said article holders and being mounted on the apparatus for movement along an oblique, straight path, inclined to said horizontal path and located in a vertical plane including the latter, from a lowermost position to an uppermost position located alongside of said free edge of said top surface of said support, said platform having a horizontal surface adapted to support articles and the like in an erect position and located at substantially the same level as said free edge of said support when said platform is in said uppermost position thereof; raising means operatively connected to said platform for raising the same along said oblique path at a speed having a horizontal component equal to said predetermined speed of said article holders so that an article on said platform may move into said one article holder while simultaneously moving horizontally with the same along said horizontal path and said article holder moving an article from said platform, when the latter is in said uppermost position thereof, onto said top surface of said support; and supply means located adjacent to said platform, when the latter is in said lowermost position thereof, for supplying articles thereto.

2. Article handling apparatus, for handling articles such as bottles and the like, comprising, in combination, a plurality of open-bottom article holders mounted on the apparatus for movement along a predetermined, straight, horizontal path; a stationary support having a top surface located directly beneath said path and having a horizontal free edge; moving means operatively connected to said article holders for continually moving the same, during operation of the apparatus, at a predetermined speed along said horizontal path over said top surface of said support and away from said free edge thereof; a platform located beneath one of said article holders and being mounted on the apparatus for movement along an oblique, straight path, inclined to said horizontal path and located in a vertical plane including the latter, from an uppermost position, located alongside of said free edge of said top surface of said support, to a lowermost position, said platform having a horizontal surface adapted to support articles and the like in an erect position and located at substantially the same level as said free edge of said support when said platform is in said uppermost position thereof; lowering means operatively connected to said platform for lowering the same along said oblique path at a speed having a horizontal component equal to said predetermined speed of said article holders, so that an article in said one article holder may be moved by the latter from said support onto said platform, when the latter is in said uppermost position thereof, and may move out of said article holder while simultaneously moving horizontally therewith along said horizontal path; and discharge means located adjacent to said platform, when the latter is in said lowermost position thereof, for discharging articles therefrom.

3. Article handling apparatus, for handling articles such as bottles and the like, comprising, in combination, a plurality of open-bottom article holders mounted on the apparatus for movement along a predetermined, straight, horizontal path; a stationary support having a pair of top surface portions spaced from each other directly beneath said path and each having one of a pair of opposite horizontal free edges located in a horizontal plane; moving means operatively connected to said article holders for continually moving the same, during operation of the apparatus, at a predetermined speed along said horizontal path over said top surface portions of said support away from one of said free edges and toward the other of said free edges; a pair of platforms respectively located beneath a pair of said article holders and being mounted on the apparatus for respective movement along a pair of oblique, straight paths, which are inclined to said horizontal path, located in a vertical plane including the latter, and diverge from each other as they approach said horizontal path, between respective uppermost positions where one of said platforms is located alongside of said one free edge of said support and the other of said platforms is located alongside of said other free edge of said support, to respective lowermost positions, said platforms respectively having top horizontal surfaces adapted to support articles and the like in an erect position and located substantially in said horizontal plane when said platforms are in said uppermost positions thereof; common actuating means operatively connected to said platforms for moving the same along said oblique paths thereof at a speed having a horizontal component equal in magnitude to said predetermined speed so that an article on said one platform will move out of the one of said pair of article holders located thereover while simultaneously moving horizontally with said one article holder and so that an article on said other platform will move into the other of said article holders while simultaneously moving horizontally therewith during upward movement of said other platform; supply means associated with said other platform for supplying articles thereto when said other platform is in said lowermost position thereof; and discharge means associated with said one platform for discharging articles therefrom when said one platform is located in said lowermost position thereof.

4. An article handling apparatus as defined in claim 3 and wherein said common actuating means is operatively connected to said platforms for simultaneously raising and lowering the same so that said platforms are simultaneously located in said uppermost and lowermost positions thereof.

5. An article handling apparatus as defined in claim 3 and wherein said supply means comprises a conveyer located alongside of said other platform when the latter is in said lowermost position thereof and a pusher means associated with said conveyer for moving articles from the latter onto said other platform.

6. An article handling apparatus as defined in claim 3 and wherein said discharge means comprises a conveyer located alongside of said one platform when the latter is in said lowermost position thereof and a pusher means associated with said one platform for moving articles from the latter onto said conveyer.

RENÉ DÉTREZ.

References Cited in the file of this patent
UNITED STATES PATENTS

| Number | Name | Date |
|---|---|---|
| 1,109,517 | Delgoffe | Sept. 1, 1914 |
| 1,451,216 | Gruetter | Apr. 10, 1923 |
| 1,506,632 | Gruetter | Aug. 26, 1924 |
| 2,133,248 | Jones | Oct. 11, 1938 |

FOREIGN PATENTS

| Number | Country | Date |
|---|---|---|
| 374,745 | Great Britain | June 16, 1932 |